US007000142B2

(12) United States Patent
McCombs

(10) Patent No.: US 7,000,142 B2
(45) Date of Patent: Feb. 14, 2006

(54) MIRRORED EXTENSIONS TO A MULTIPLE DISK STORAGE SYSTEM

(75) Inventor: Craig C. McCombs, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 512 days.

(21) Appl. No.: 10/205,680

(22) Filed: Jul. 25, 2002

(65) Prior Publication Data

US 2004/0019824 A1 Jan. 29, 2004

(51) Int. Cl.
*G06F 11/00* (2006.01)
(52) U.S. Cl. .............................................. 714/6; 714/7
(58) Field of Classification Search .................. 714/6, 714/13
See application file for complete search history.

(56) References Cited

U.S. PATENT DOCUMENTS

| | | | |
|---|---|---|---|
| 5,790,773 A | * | 8/1998 | DeKoning et al. ............. 714/6 |
| 5,845,295 A | | 12/1998 | Houseman et al. |
| 6,480,970 B1 | * | 11/2002 | DeKoning et al. ............. 714/6 |
| 6,587,970 B1 | * | 7/2003 | Wang et al. .................. 714/47 |
| 6,694,447 B1 | * | 2/2004 | Leach et al. ................... 714/6 |
| 6,779,130 B1 | * | 8/2004 | Sprunt et al. .................. 714/6 |
| 2002/0188887 A1 | * | 12/2002 | Largman et al. ............. 714/13 |

OTHER PUBLICATIONS

Lewis, Phil, A High Availability Cluster for Linux, Aug. 1999, Specialized Systems Consultants, Inc., Seattle, WA, Issue 64, vol. 1999, pp. 2 and 6.*
Oracle, Oracle7 and EMC TimeFinder, Jun. 1997, Oracle Corporation, pp. 3 and 9.*

* cited by examiner

*Primary Examiner*—Scott Baderman
*Assistant Examiner*—Paul F. Contino
(74) *Attorney, Agent, or Firm*—Cochran Freund & Young, LLC

(57) ABSTRACT

Disclosed is a system and method for using a mirrored disk as a bootable backup disk for a computer system. A mirroring routine may be used to create a backup disk, then discontinued during normal operations. Should a problem occur with the main disk, the computer system may be rebooted using the backup disk and the main disk can be rebuilt from the backup disk using the mirroring routine. The system and method may be applied to two disk systems and various multiple-disk arrays such as RAID systems.

9 Claims, 5 Drawing Sheets

MIRRORED EXTENSIONS TO A MULTIPLE DISK STORAGE SYSTEM

BACKGROUND OF THE INVENTION a. Field of the Invention

The present invention pertains generally to disk storage systems and specifically to disk storage systems with provisions for disaster recovery.

b. Description of the Background

Redundant arrays of independent disks (RAID) is standardized technology for the storage of data with emphasis on performance, fault tolerance, and the ability to recover data due to a failure of a disk drive. Many RAID products are commercially available.

The RAID Advisory Board of St. Peter, Minn. has defined and standardized several different RAID levels. RAID level 1 ('RAID 1'), for example, is a mirrored disk wherein a complete copy of the data on one disk is simultaneously maintained and stored on a second disk. In the event of a failure of one disk, a complete copy of the data on the second disk is available. The data on the second disk may be used to recreate the data on the first disk when the first disk is replaced or repaired. RAID 5 uses several disks to store data in stripes for read and write speed. RAID 5 also incorporates parity data recovery method for tolerating the failure of a complete disk drive in the system.

Hot spare disks may be present in a RAID storage system. A hot spare disk is one that is capable of being used, but sits idle until one of the disks in a RAID system need to be replaced.

The existing technology addresses the need for disaster recovery from errors in the disk drives such as media problems, disk crashes, noisy communications, and other problems that may destroy data or prohibit data access. However, the RAID technology does not address problems such as virus attacks, unintentional deletion of files, and other forms of data corruption where a backup system is required to restore the system to operation. For example, a virus attack may cripple a computer, wiping out files and data that are essential for the functioning of the computer. The only alternative for a system administrator may be to reinstall essential operating software and data from a back up. Such operations may take several hours to complete, leaving an otherwise essential computer out of service for a substantial amount of time.

It would therefore be advantageous to provide a system and method for recovering from data corruption problems quickly and with a minimum of data loss. Further it would be advantageous if the backup system used elements of existing RAID technologies.

SUMMARY OF THE INVENTION

The present invention overcomes the disadvantages and limitations of the prior art by providing a system and method of creating a bootable copy of a main disk using mirroring. The mirror operation may be stopped such that the bootable copy may act as a protected backup of the main disk, available to restart a computer in the event of a corruption of the main disk, such as after a virus attack or other corruption of the main disk. Enabling the mirror operation periodically may refresh the bootable copy.

The present invention may therefore comprise a method of using a backup storage system for a computer comprising: creating a main storage system capable of booting the computer system; enabling a mirroring operation to mirror the main storage system onto the backup storage system wherein the backup storage system is capable of booting the computer system; disabling the mirroring operation; operating the computer system with the main storage system; determining that a problem exists with the data on the main storage system; shutting down the computer system; booting the computer system using the backup storage system; operating the computer system with the backup storage system; mirroring the backup storage system onto the main storage system; disabling the mirroring operation; and operating the computer system with the main storage system.

The present invention may further comprise a method of updating a backup storage system comprising: creating a bootable backup storage system by turning on a mirror function such that a main storage system is mirrored onto a backup storage system that is capable of booting a computer; disabling the mirror function; operating the computer using the main storage system; determining that a backup operation shall take place; turning on the mirror function such that the main storage system is mirrored onto the backup storage system; and disabling the mirror function.

The present invention may further comprise a computer storage apparatus with a bootable backup system comprising: a main storage system that is capable of booting and operating a computer; a backup storage system; and a controller adapted to execute a mirror operation to create a mirrored copy of the main storage system onto the backup storage system, the controller further adapted to turn off the mirror operation to enter a normal mode of operation wherein the computer is operated from the main storage system, the computer adapted to be rebooted using the backup storage system and the controlled adapted to execute a mirror operation to create a mirrored copy of the backup storage system onto the main storage system.

The advantages of the present invention are that a backup system may be kept in the event of data corruption of a main storage system such that a computer may be rebooted using the backup system. Having a bootable backup system with a known good configuration allows a computer to suffer a virus attack, hacker attack, or other corruption of data, then be switched over to the backup system and return to functioning very quickly. Further, the system may rebuild the main storage disk from the backup disk after restarting the computer. The routines commonly used in RAID controllers for mirroring, such as in RAID 1 controller, may be adapted to create and update the backup disk systems and also to rebuild the main disk system after a problem occurs. In RAID systems containing a hot spare disk, the present invention allows the hot spare to be used as a bootable backup for emergency recovery.

DETAILED DESCRIPTION OF THE INVENTION

Figure 1:
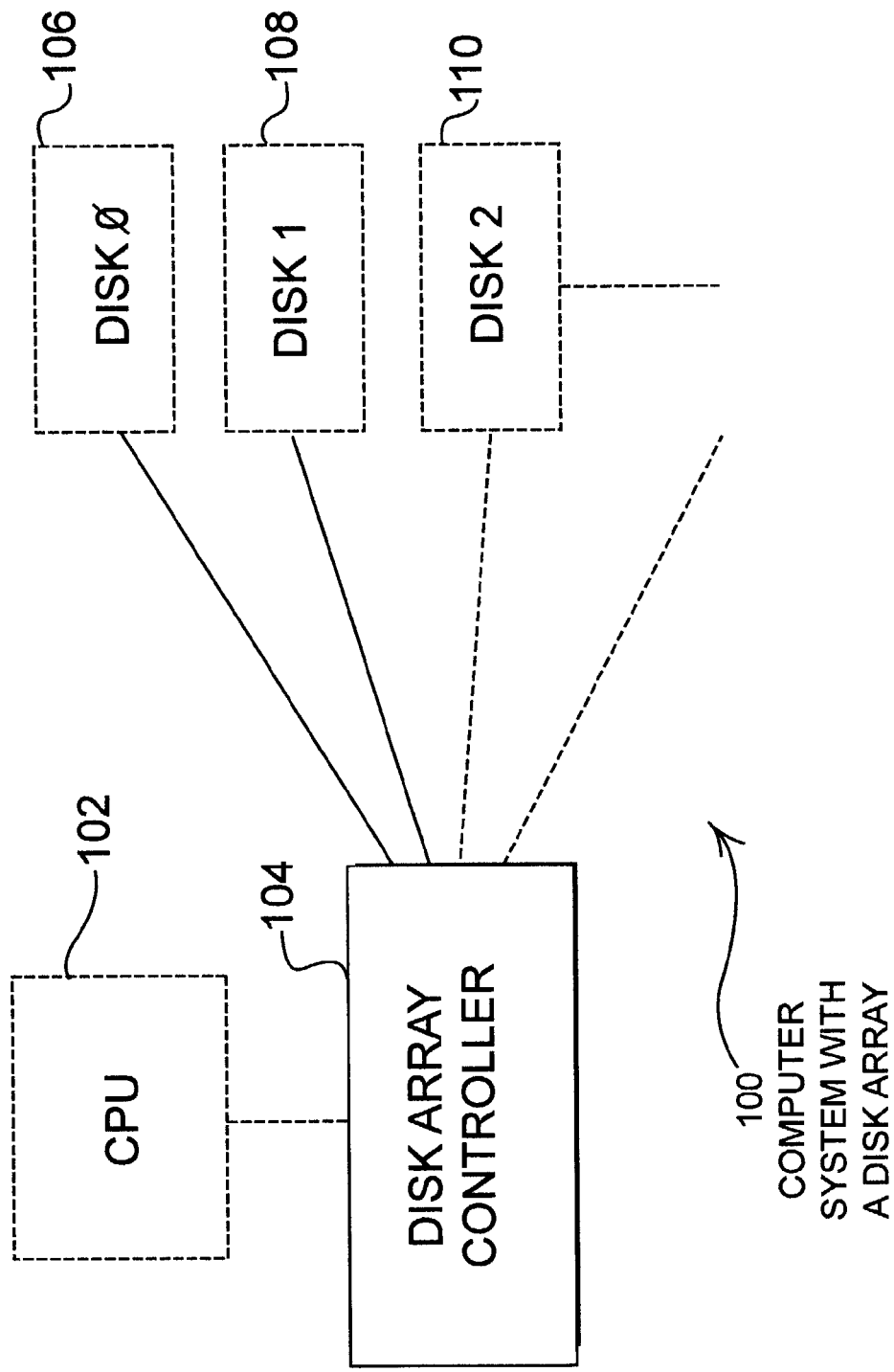
FIG. 1 is a block diagram of a portion of a computer that has a disk array.

FIG. 1 is a block diagram of a portion 100 of a computer that has a disk array. The central processing unit 102 is connected to a disk array controller 104 that is in turn connected to one or more disks 106, 108, and 110. In many cases, the disk array controller 104 may be a RAID controller capable of various RAID techniques, such as striping, mirroring, parity calculation and storage, and other techniques. For example, the disk array controller 104 may use a RAID 1 method for mirroring disks 106 and 108 such that both disks store information redundantly. In the present invention, the disk array controller 104 may be used to create a bootable backup disk that may be used for quick disaster recovery in the case of a large scale data corruption error.

Figure 2:
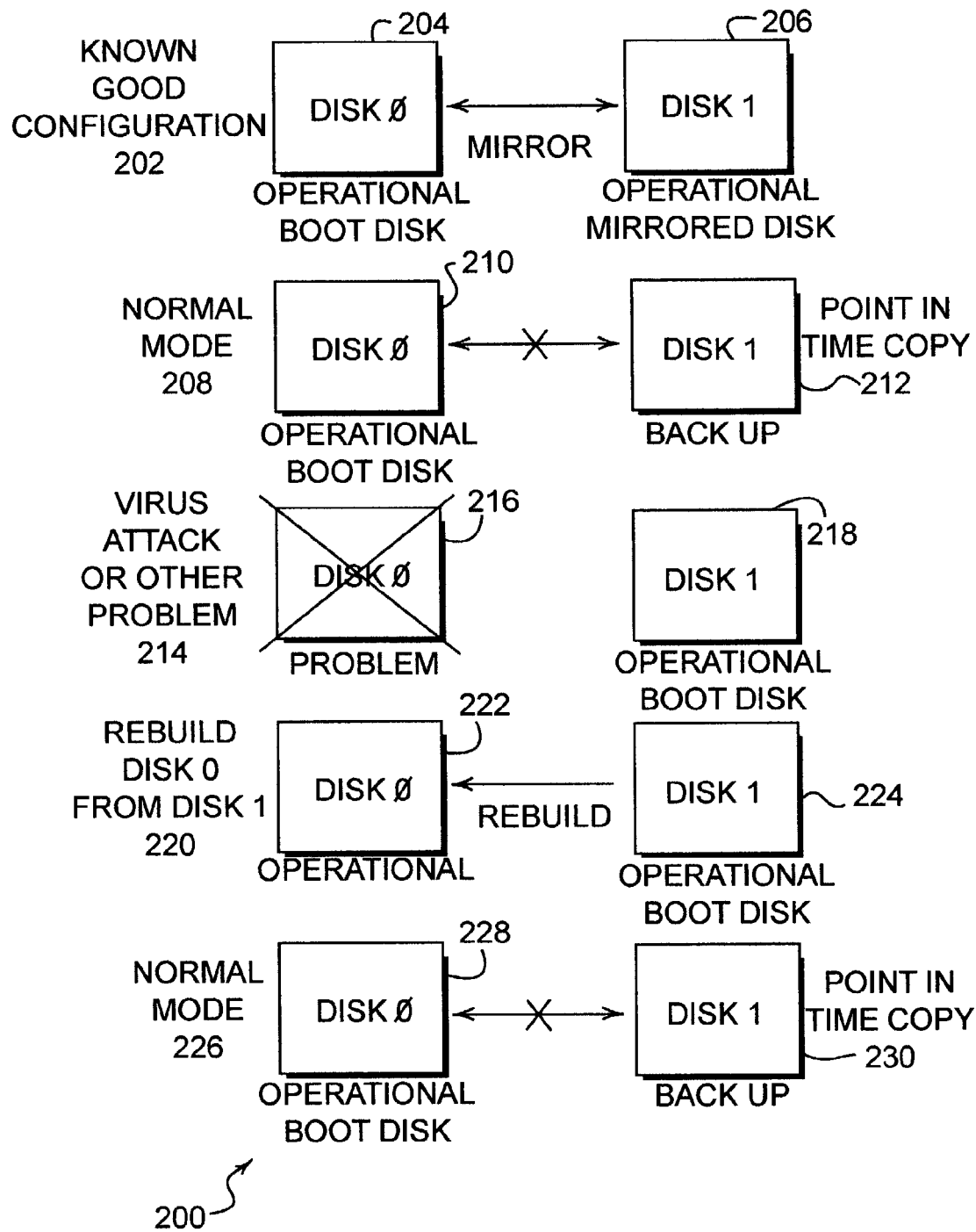
FIG. 2 is an illustration of an embodiment of the present invention of a method of using a mirrored drive as a bootable backup disk.

FIG. 2 illustrates a method 200 of using a mirrored drive as a bootable backup disk. In the known good configuration 202, the first disk 204 is mirrored with the second disk 206. The mirroring may use standard RAID 1 mirroring hardware and software or the mirroring may be executed in software. The known good configuration 202 may be at any point where an administrator determines that the system is functioning correctly. At that point, the administrator may change the system to normal mode 208, wherein the first disk 210 is used for normal operations and the second disk 212 is used as a point in time backup disk.

In the event of a virus attack or other problem 214, the first disk 216 may be taken offline and the computer rebooted on the second drive 218. At this point, the computer is operating off of the data contained on the second drive 218 and ignoring any data on the first drive 216. Data corruption of the first drive 216 may be due to a virus infecting the system or by other problems such as when a user or administrator accidentally overwrites or deletes certain data, hackers infiltrate the system, acts of vandalism, or other corruption of the data. In some cases, the data corruption may be due to human acts, such as vandalism or an operator error. In other cases, a hardware problem may cause the data on the operable disk to become corrupted.

The backup disk 212 in normal mode 208 may not be available to the controller. In other words, the backup disk 212 may be offline, unpowered and not spinning while in normal mode 208. In some embodiments, the backup disk 212 may be mechanically and electrically disconnected from the controller. For example, the disk may be mounted in a 'hot swap' carriage so that the disk may be removed from the system and carried away. Such an embodiment may be applicable when an offsite backup procedure may be warranted and the disk may be stored in a separate physical location. Applications for these embodiments may be for when the data on the disk system is not updated frequently.

The backup disk 212 may be a hot spare disk as commercially available in some RAID systems. The hot spare disk may be operably connected to the RAID controller at all times, but disk transfers to the backup disk 212 may be disabled while the disk 212 is being used as a backup disk.

The backup disk 212 may be online during normal mode 208 in some embodiments. In such embodiments, the backup disk 212 may be refreshed periodically so that the backup disk 212 closely corresponds with the operational boot disk 210. For example, if the system was operating in normal mode 208, an administrator may periodically rebuild the backup disk as a mirrored drive of the operational disk. This operation essentially refreshes the backup disk so that the data on the disk is more current in the event of a problem. In some embodiments, the hardware used to operate the backup disk 212 may be similar to the hardware necessary for a 'hot spare' disk that may be part of a RAID disk system. In those embodiments, the 'hot spare' disk may be selectively used by the RAID controller as the backup disk 212.

Figure 3:
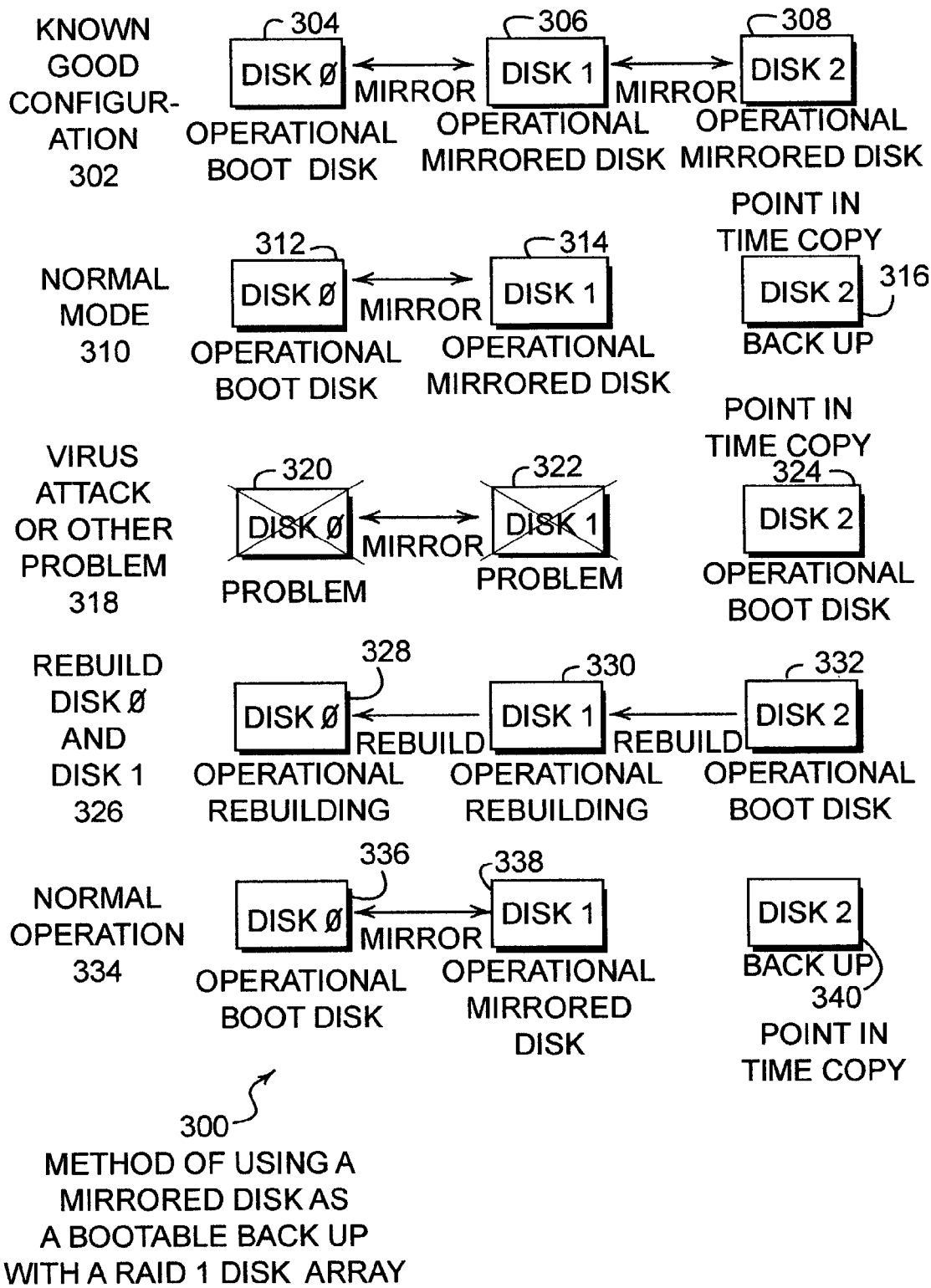
FIG. 3 is an illustration of an embodiment of the present invention of a method of using a mirrored drive as a bootable backup with a RAID 1 disk array.

FIG. 3 illustrates an embodiment 300 of a method of using a mirrored drive as a bootable backup with a RAID 1 disk array. In the present embodiment, three disks are present in the system. Two disks operate as a RAID 1 system, that is, they are mirrored disks with the redundancy features of a RAID 1 system. A third disk is a backup disk that is a mirrored copy of the first two disks. However, the backup disk can have the mirror function turned off, leaving the backup disk as a point in time copy of the mirrored drives. In the event of a problem, the system can be restarted using the backup disk and the main mirrored drives can be rebuilt from the backup disk.

In the known good configuration 302, disks 304, 306, and 308 are mirrored copies of each other. In the normal operating mode 310, the disks 312 and 314 operate as a RAID 1 system with full mirroring redundant capabilities while disk 316 is a point in time copy off the data contained in the mirrored drive. When a virus attack or other problem occurs 318 rendering the mirrored drives 320 and 322 unusable or corrupt, the backup disk 324 may be used to restart the computer into the known good configuration 302. After the computer is restarted, the rebuild process 326 allows the RAID 1 array of disks 328 and 330 to be rebuilt from the backup disk 332. Normal operation 334 may then resume with a RAID 1 system of disks 336 and 338 and a backup disk 340.

One of the advantages of the present embodiment is that disk array controllers for RAID 1 systems have several of the processes and procedures already implemented. For example, the ability to build a mirrored drive and the ability to rebuild a failed drive may already exist in a RAID 1 controller. These processes may be implemented in hardware for speed. Thus the present embodiment of the present invention may thus be a modification of existing systems.

In some embodiments, the backup disk drive may be the same type of disk drive as the drives contained in the RAID 1 system. In other embodiments, the backup disk drive may be a lower performance, and thus lower cost, disk drive. In still other embodiments, the backup disk drive may be a higher performance and possibly more reliable disk drive than those in the RAID 1 system.

The backup disk may be located in a hot spare slot of a RAID system. A hot spare is a disk drive that is normally not part of the RAID system but can be brought online instantly in the event of a failure of other of the other RAID drives. The use of the hot spare as a backup disk may utilize existing hardware configurations.

Figure 4:
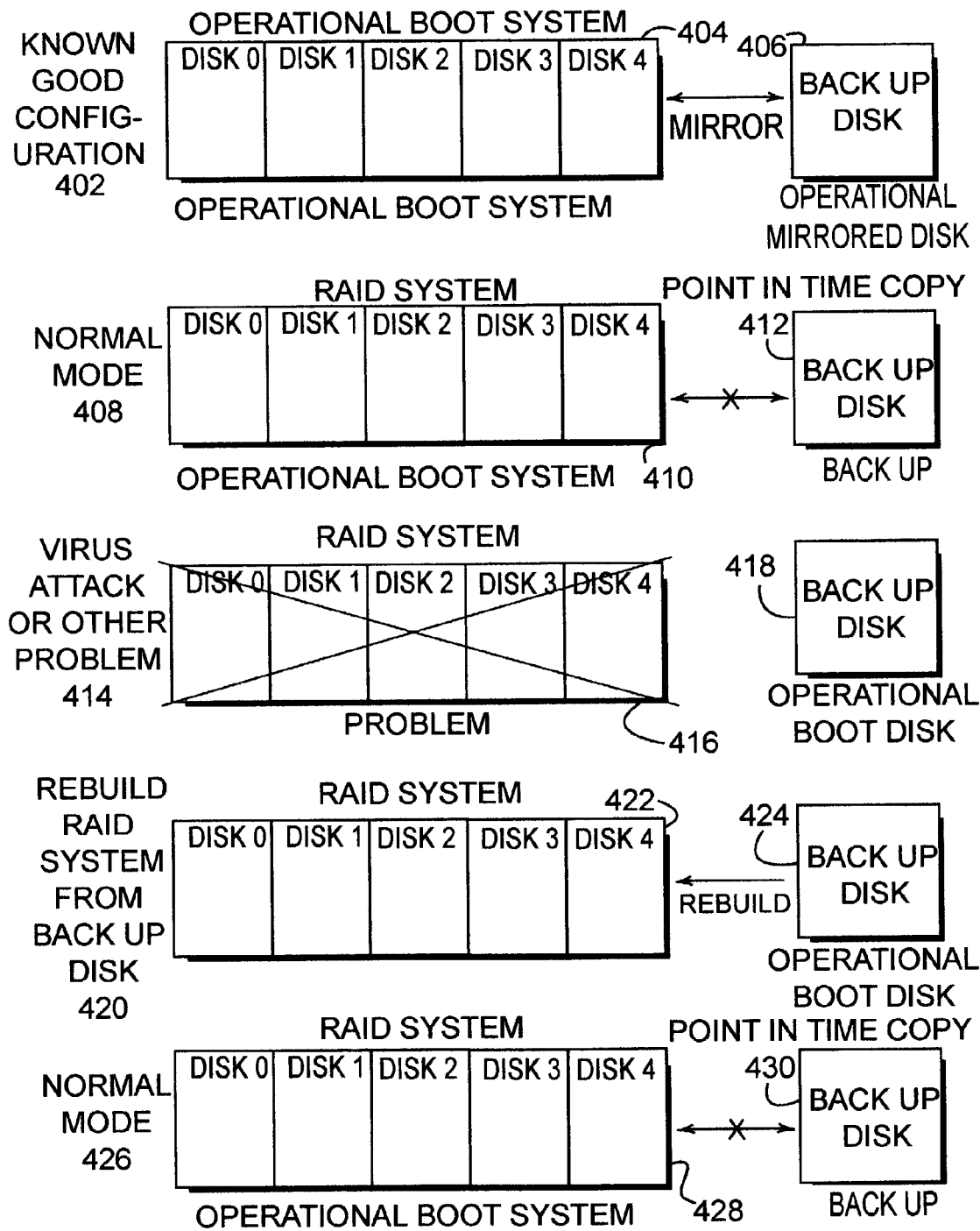
FIG. 4 is an illustration of an embodiment of the present invention of a method of using a mirrored disk as a bootable backup with a RAID 5 array.

FIG. 4 illustrates an embodiment 400 of the present invention of a method of using a mirrored disk as a bootable backup with a RAID 5 array. In the present embodiment, a RAID 5 system comprising five disk drives is backed up onto a single disk drive. The computer may be rebooted onto a backup disk that is bootable in the case of a significant problem with the RAID 5 system. After the system is rebooted from the backup disk, the RAID 5 system can be rebuilt from the backup disk.

In the known good configuration 402, a RAID system 404 is mirrored onto a backup disk 406. After mirroring, the system may enter normal mode 408 wherein the RAID system 410 operates normally with the backup disk 412 being a point in time copy that is not changed during normal operation 408. When a virus attack or other problem occurs 414 rendering the RAID system 416 unusable, the computer system can be restarted or rebooted from the backup disk 418. When the system is again operational, the rebuild process 420 rebuilds the RAID system 422 from the backup disk 424. When the rebuild process 420 is complete, the system again may enter normal mode 426 where the RAID system 428 operates normally and back up disk 430 contains a known good bootable system disk.

The backup disk may be a single disk drive or may be a disk array. In some embodiments, the backup disk may be a virtual disk drive that appears to the computer as a single disk drive but is comprised of a plurality of physical disk drives, such as a RAID system. In general, the backup disk may be equal to or greater than the total storage capacity of the RAID volume.

Figure 5:
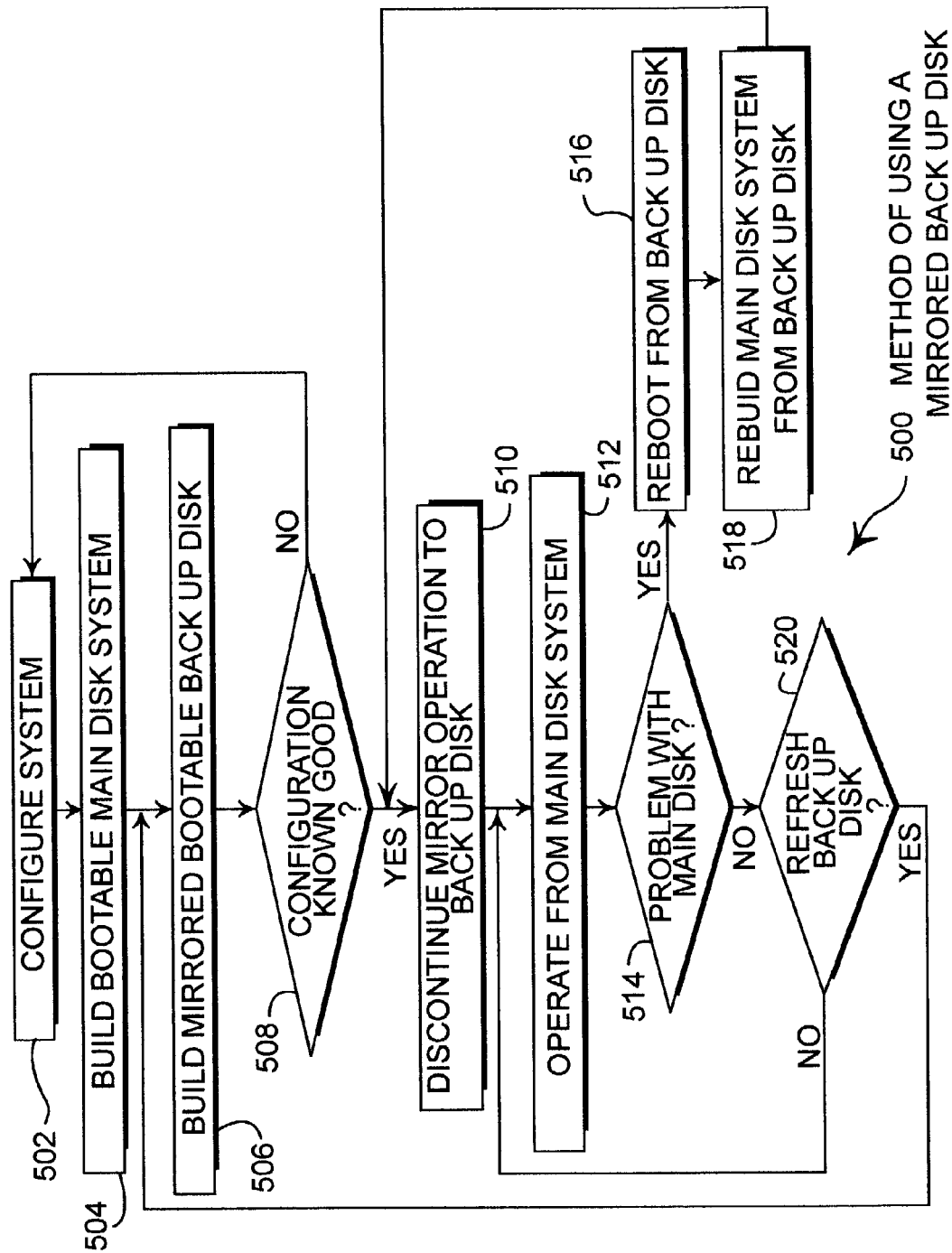
FIG. 5 is a workflow diagram of an embodiment of the present invention of a method of using a mirrored backup disk.

FIG. 5 illustrates a workflow of an embodiment 500 of the present invention of a method of using a mirrored backup disk. The system is configured 502 and a bootable main disk is built 504. Subsequently or simultaneously, a mirrored bootable disk is built 506. When the configuration is known good 508, normal operation is begun wherein the mirror operation to the backup disk is discontinued 510 and the system operates from the main disk 512. If a problem with the main disk occurs 514, the computer is rebooted from the backup disk 516 and the main disk is rebuilt from the backup disk 518. If the backup disk is to be refreshed 520, the mirror function to the backup disk is restarted 506 until the backup disk is built, then normal operations are continued.

Problems with the main disk may be detected by an operator or may be detected automatically. For example, if a virus attacked a computer system, the system may be able to detect the problem, and automatically switch to the backup drive and reboot itself completely under automatic control. In other embodiments, the switchover to the backup disk may require an operator intervention. In embodiments where the backup disk is taken offline and disconnected, an operator would, of course, have to insert the backup disk into the system. In embodiments where the backup disk is online, an operator intervention may still be required.

The mirroring operations described in this specification may be performed in several methods. For example, the computer may operate software to create the mirrored disks. In the preferred embodiment, the mirroring operations may be performed by a disk controller that can execute a sector-by-sector mirror operation on a plurality of disks. Such a controller may execute mirror routines directly in dedicated hardware or may use a combination of hardware and software. Such systems may relieve the main processor of the computer from managing the disk drives and may execute their tasks more efficiently.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of using a hot spare drive as backup storage for a computer system comprising:
   creating a main storage system capable of booting said computer system;
   providing a hot spare drive;
   enabling a mirroring operation to mirror said main storage system onto said hot spare drive wherein said hot spare drive is capable of booting said computer system;
   disabling said mirroring operation;
   operating said computer system with said main storage system;
   determining that a problem exists with the data on said main storage system;
   shutting down said computer system;
   booting said computer system using said hot spare drive;
   operating said computer system with said hot spare drive;
   mirroring said hot spare drive onto said main storage system;
   disabling said mirroring operation; and
   operating said computer system with said main storage system.

2. The method of claim 1 wherein said main storage system comprises a RAID storage system.

3. The method of claim 2 wherein said main storage system comprises a RAID level 5 storage system.

4. The method of claim 2 wherein said main storage system comprises a RAID level 1 storage system.

5. A computer storage apparatus that uses a hot spare drive as a bootable backup system comprising:
   a main storage system that is capable of booting and operating a computer;
   a hot spare drive; and
   a controller that executes a mirror operation to create a mirrored copy of computer programs and data stored on said main storage system, including an operating apparatus that is capable of booting said computer storage apparatus, onto said hot spare drive, and turning off said mirror operation to enter a normal mode of operation such that said computer is operated during said normal mode of operation from said main storage system, said hot spare drive being used to reboot said computer storage apparatus if data in said main storage system is corrupted and said controller executing a minor operation to create a mirrored copy of said computer programs and data stored on said hot spare drive onto said main storage system.

6. The computer storage apparatus of claim 5 wherein said controller periodically executes said mirror operation to create a mirrored copy of said main storage system onto said hot spare drive.

7. The computer storage apparatus of claim 5 wherein said main storage system comprises a RAID storage system.

8. The computer storage apparatus of claim 7 wherein said main storage system comprises a RAID level 5 storage system.

9. The computer storage apparatus of claim 7 wherein said main storage system comprises a RAID level 1 storage system.

* * * * *